United States Patent Office 2,771,666
Patented Nov. 27, 1956

2,771,666

REFRACTORY BODIES

Ivor E. Campbell, Gahanna, and Bruce W. Gonser and Carroll F. Powell, Columbus, Ohio, assignors, by mesne assignments, to Fansteel Metallurgical Corporation, North Chicago, Ill., a corporation of New York No Drawing. Application March 18, 1950,
Serial No. 150,542

8 Claims. (Cl. 29—198)

This invention relates to metal bodies resistant to oxidation at elevated temperatures and more particularly to such bodies formed of the refractory metals, tungsten, tantalum and columbium, which are provided with a coating or skin so as to render the metal base resistant to oxidation at elevated temperatures.

The refractory metals, tungsten, tantalum and columbium, have highly desirable properties and characteristics for many purposes. Tungsten, for example, retains its mechanical properties at elevated temperatures. Tungsten and tantalum are very desirable for use in electrical furnace heating elements. However, in order to prevent oxidation of the metal it is necessary to exclude oxygen. In the use of tungsten elements for such purpose a continuous flow of hydrogen is maintained over the heated resistance elements. Tantalum and columbium are highly resistant to chemical attack, particularly acids, however they must be handled cautiously at higher temperatures to prevent the absorption of gases. Heating of tantalum and columbium in the atmosphere or in gases results in an embrittlement of the metal.

The principal purpose of the present invention is to provide refractory metal bodies formed of these metals having a coating or skin which is resistant to oxidation at elevated temperatures and which protects the base or core from oxidation at such temperatures.

Other objects and advantages of this invention will become apparent from the description which follows.

The present invention contemplates bodies of the refractory metals, tungsten, tantalum and columbium, normally oxidizable at high temperatures, having a coating or skin of the refractory metal-silicon alloys or intermetallic compounds.

Methods are known whereby silicon may be deposited as an adherent coating to these refractory metals. One of these methods includes passing a mixture of hydrogen and vapors of a silicon halide over the heated refractory metal. The protection afforded by the silicon coating or film is limited by the melting point of silicon and by its tendency to alloy with the refractory metal. For many purposes the melting point is sufficiently high to afford some degree of protection for the refractory material base or core.

The refractory metal-silicon skin or coating affords protection against oxidation at appreciably higher temperatures. This skin or coating may be formed by any desired method.

In the protection of the refractory metal bodies having the silicide skin or coating, silicon may be applied to or deposited on the metal and the coated metal maintained in a protective atmosphere or in a vacuum at a temperature of the order of or higher than the melting point of silicon. During this treatment the refractory metal and silicon react or alloy with each other to form an intermetallic compound or alloy. The alloy coating may also be formed on the refractory metal base by maintaining the refractory metal at higher temperatures during the deposition of silicon. If the metal base is maintained at temperatures above or in the neighborhood of the melting point of silicon, the alloy or intermetallic compound is formed directly.

We have discovered that the alloy coatings are superior to the silicon coating not only in their ability to protect the metals at higher temperatures but also in their greater adherence to the metal base, being more or less integral with the metal base. The precise chemical compositions of the alloy coatings or skins appear to have a direct bearing upon the oxidation resistance of the bodies. The silicon content of the coatings or skins may vary in the molecular ratio of silicon to refractory metal of from about 1:1 to about 3:1. These alloys or intermetallic compounds contain from about 13.2% to about 31.4% silicon in the case of tungsten, from about 13.4% to about 31.8% silicon in the case of tantalum and from about 23.2% to about 47.5% in the case of columbium. An alloy or a compound corresponding to a molecular ratio of silicon to the refractory metal of about 2:1, or containing about 23.2% silicon in the case of tungsten, about 23.7% silicon in the case of tantalum and about 37.7% silicon in the case of columbium, appears to exhibit optimum protection against oxidation at elevated temperatures. However, it is to be understood that coatings or skins outside this composition range also afford some protection for the metal base or core. The alloy coatings or skins in the above composition range appear to be more ductile than relatively pure silicon coatings, particularly at elevated temperatures.

The deposition of silicon on the refractory metal and the formation of the protective alloy or intermetallic compound coating or skin may be conveniently effected by a deposition method. The refractory metal body is heated in hydrogen or in a vacuum and a mixture of hydrogen and the vapors of a silicon halide passed over the heated body. For example, a tungsten rod or wire may be heated above the desired plating temperature for several minutes in a hydrogen atmosphere. The wire or rod may be heated by passing an electric current through the wire or rod or by induction. The temperature of the body is then reduced to the desired plating temperature and the mixture of hydrogen and the vapors of a silicon halide is passed over the body. The plating temperature may be varied, however, this temperature must be sufficiently high so as to decompose the silicon halide and deposit silicon on the metal body.

The type of coating produced is dependent upon the temperature of the body during the plating treatment. In those instances where the body is maintained at a temperature below the melting point of silicon, the predominant constituent of the coating will be silicon. As the plating temperature approaches the melting point of silicon, some of the silicon reacts or alloys with the metal to form alloy or intermetallic compound. Where these lower plating temperatures are employed, the silicon coated body is subsequently heated to a temperature of the order of the melting point of silicon or higher so as to permit substantially complete alloying or interaction of the silicon and metal.

In those instances where the body is maintained at a temperature at least as high as the melting point of silicon during the plating operation, for example, 1500° C. to 1600° C., the silicon reacts or alloys with the metal to directly form the highly protective alloy or intermetallic skin or coating. The thickness of the coating may be controlled by regulating the plating time and temperature.

The protection afforded these refractory metals by the alloy or intermetallic coatings may be illustrated by the following examples:

Samples of tungsten, tantalum and columbium in the form of wire having a diameter of 0.080 inch were provided with an alloy coating or skin of approximately 0.001 inch in thickness, as described hereinbefore. A number of such samples of the treated or coated wires and a group of samples of untreated or uncoated wires were heated to about 1000° C. in air by passing an electric current through the wires. The average life of these samples at this temperature was as follows:

| Metal Core | Average life | |
|---|---|---|
| | Untreated, hours | Coated with Metal-Si Alloy, hours |
| Columbium | 0.17 | 10 |
| Tantalum | 0.17 | 26 |
| Tungsten | 0.60 | 28 |

The oxidation resistance of these metals may be further increased by applying the coating or skin in successive layers with intermediate soaking periods. During the intermediate soaking periods the temperature of the metal body is maintained sufficiently high to insure a complete formation of the alloy or intermetallic compound.

Although the invention has been illustrated by the formation of the coatings by deposition of the silicon from a vaporized silicon compound and hydrogen, other methods may be employed. For example, the silicon may be deposited on the metal body by a spraying operation, or other suitable method so as to provide a silicon coating. The coated metal is then subjected to a heat treatment, as by heating in a hydrogen atmosphere or under other suitable conditions, in order to permit a diffusion of and interaction between the silicon and molybdenum thereby forming the highly protective alloy or intermetallic compound skin or coating.

It is to be understood that the foregoing description is merely illustrative of our invention and that the specific examples included above are not intended as limitations. The specific examples have described the preparation of coated or alloyed wire. Bars, strips and other bodies have been similarly protected against oxidation at elevated temperatures. The description of the treatment of wire and the testing of wire affords a ready illustration of the effectiveness of the coatings or skins and of the comparison of the bodies of this invention with the metals themselves.

We claim:

1. As an article of manufacture, a refractory metal body, comprising a refractory metal base selected from the group consisting of tungsten, tantalum and columbium, having an exterior exposed layer composed predominantly of an alloy or intermetallic compound of the selected metal and silicon, the alloy containing silicon in a molecular ratio to the refractory metal of from about 1:1 to about 3:1, the body being characterized by a high resistance to oxidation at temperatures above about 1000° C.

2. As an article of manufacture, a refractory metal body, comprising a refractory metal base selected from the group consisting of tungsten, tantalum and columbium, having an exterior exposed layer composed predominantly of an alloy or intermetallic compound of the selected metal and silicon, the alloy containing silicon in a molecular ratio to the refractory metal of about 2:1, the body being characterized by a high resistance to oxidation at temperatures above about 1000° C.

3. As an article of manufacture, a refractory metal body, comprising a tungsten base having an exterior exposed layer composed predominantly of an alloy or intermetallic compound of tungsten and silicon, the alloy containing from about 13.2% to about 31.4% silicon and the balance tungsten, the body being characterized by a high resistance to oxidation at temperatures above about 1000° C.

4. As an article of manufacture, a refractory metal body, comprising a tungsten base having an exterior exposed layer composed predominantly of an alloy or intermetallic compound of tungsten and silicon, the alloy containing about 23.2% silicon and the balance tungsten, the body being characterized by a high resistance to oxidation at temperatures above about 1000° C.

5. As an article of manufacture, a refractory metal body, comprising a tantalum base having an exterior exposed layer composed predominantly of an alloy or intermetallic compound of tantalum and silicon, the alloy containing from about 13.4% to about 31.8% silicon and the balance tantalum, the body being characterized by a high resistance to oxidation at temperatures above about 1000° C.

6. As an article of manufacture, a refractory metal body, comprising a tantalum base having an exterior exposed layer composed predominantly of an alloy or intermetallic compound of tantalum and silicon, the alloy containing about 23.7% silicon and the balance tantalum, the body being characterized by a high resistance to oxidation at temperatures above about 1000° C.

7. As an article of manufacture, a refractory metal body, comprising a columbium base having an exterior exposed layer composed predominantly of an alloy or intermetallic compound of columbium and silicon, the alloy containing from about 23.2% to about 47.5% silicon and the balance columbium, the body being characterized by a high resistance to oxidation at temperatures above about 1000° C.

8. As an article of manufacture a refractory metal body, comprising a columbium base having an exterior exposed layer composed predominantly of an alloy or intermetallic compound of columbium and silicon, the alloy containing about 37.7% silicon and the balance columbium, the body being characterized by a high resistance to oxidation at temperatures above about 1000° C.

References Cited in the file of this patent

UNITED STATES PATENTS

| | | |
|---|---|---|
| 1,718,563 | Kelly | June 25, 1929 |
| 1,853,370 | Marshall | Apr. 12, 1932 |
| 2,282,097 | Taylor | May 5, 1942 |
| 2,441,603 | Storks et al. | May 18, 1948 |